United States Patent
Yao

(10) Patent No.: US 10,547,481 B2
(45) Date of Patent: Jan. 28, 2020

(54) CLIPPING METHOD AND APPARATUS

(71) Applicant: Huawei Technologies Co., Ltd., Shenzhen, Guangdong (CN)

(72) Inventor: Jianzhong Yao, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/010,259

(22) Filed: Jun. 15, 2018

(65) Prior Publication Data

US 2018/0295008 A1    Oct. 11, 2018

Related U.S. Application Data

(63) Continuation of application No. PCT/CN2015/097744, filed on Dec. 17, 2015.

(51) Int. Cl.
*H04K 1/02* (2006.01)
*H04L 27/26* (2006.01)
(Continued)

(52) U.S. Cl.
CPC ....... *H04L 27/2623* (2013.01); *H04B 1/0475* (2013.01); *H04W 72/0453* (2013.01); *H04W 72/082* (2013.01); *H04W 88/085* (2013.01)

(58) Field of Classification Search
CPC ..... H04L 27/2623; H04L 5/001; H04L 27/26; H04B 1/0071; H04B 1/0475; H04W 72/0453; H04W 72/082; H04W 88/085
(Continued)

(56) References Cited

U.S. PATENT DOCUMENTS 9,699,751 B2 * 7/2017 Griffioen ............ H04W 56/002
2003/0179833 A1 * 9/2003 Porco ...................... H04L 5/06
375/297
(Continued)

FOREIGN PATENT DOCUMENTS

CN         1702964 A      11/2005
CN       101068233 A      11/2007
(Continued)

OTHER PUBLICATIONS

Srivastava, Gauraw Kumar, et al., "Crest Factor Reduction for Carrier Aggregated OFDM Systems," SoftCOM 2012, 20th International Conference on Software, Telecommunications and Computer Networks, Sep. 11-13, 2012, 6 pages, XP032470608.

*Primary Examiner* — Helene E Tayong
(74) *Attorney, Agent, or Firm* — Slater Matsil, LLP

(57) ABSTRACT

Embodiments of the present disclosure provide a clipping method and an apparatus. The clipping apparatus is a base station, and the base station includes a baseband unit (BBU) and a remote radio unit (RRU). The BBU includes a first processor, and the RRU includes a second processor. The first processor is configured to: perform clipping after combining N input carriers, and output N carriers obtained after a first level of clipping; and the second processor is configured to: perform clipping after combining the N carriers obtained after the first level of clipping, and output N carriers obtained after a second level of clipping, where N is an integer greater than or equal to 2. The base station separately performs clipping at the BBU and the RRU, so that the base station can flexibly select, a baseband processing board or a baseband chip to deploy the first level of clipping.

10 Claims, 2 Drawing Sheets

(51) Int. Cl.
*H04B 1/04* (2006.01)
*H04W 72/04* (2009.01)
*H04W 72/08* (2009.01)
*H04W 88/08* (2009.01)

(58) Field of Classification Search
USPC .................................................. 375/297, 226
See application file for complete search history.

(56) References Cited

U.S. PATENT DOCUMENTS

| | | | | |
|---|---|---|---|---|
| 2005/0101244 A1* | 5/2005 | Lipka | ................... | H04B 7/0671 |
| | | | | 455/1 |
| 2011/0092173 A1* | 4/2011 | McCallister | .......... | H03F 1/3247 |
| | | | | 455/108 |
| 2011/0316623 A1* | 12/2011 | Bohn | .................... | H03F 1/0227 |
| | | | | 330/127 |
| 2014/0362951 A1* | 12/2014 | Fehri | .................. | H04L 27/2623 |
| | | | | 375/297 |
| 2015/0004923 A1* | 1/2015 | Beaudin | .................. | H04B 1/04 |
| | | | | 455/127.2 |

FOREIGN PATENT DOCUMENTS

| | | |
|---|---|---|
| CN | 101222468 A | 7/2008 |
| CN | 101321146 A | 12/2008 |
| CN | 102098255 A | 6/2011 |
| CN | 103718525 A | 4/2014 |
| CN | 102340471 B | 9/2014 |
| CN | 104601511 A | 5/2015 |
| EP | 3226500 A1 | 10/2017 |
| JP | 2011009946 A | 1/2011 |

\* cited by examiner

CLIPPING METHOD AND APPARATUS

CROSS-REFERENCE TO RELATED APPLICATIONS

This application is a continuation of International Application No. PCT/CN2015/097744, filed on Dec. 17, 2015, the disclosure of which is hereby incorporated by reference in its entirety.

TECHNICAL FIELD

Embodiments of the present application relate to communications technologies, and in particular, to a clipping method and an apparatus.

BACKGROUND

In a radio communications system, to improve working efficiency of a power amplifier and protect the power amplifier from being damaged by a received noise signal that has an extremely large peak value, a transmitter needs to perform clipping processing on a to-be-transmitted signal before transmitting the signal. Currently, a widely used clipping manner is a crest factor reduction (CFR) technology, which is a signal processing method for smoothly suppressing a signal peak. Clipping may cause an increase of error vector magnitude (EVM) of a signal, and make the signal distorted. Therefore, in a case in which a signal is ensured to meet an EVM indicator in clipping processing, a peak-to-average power ratio (PAPR) of the signal is reduced as much as possible to ensure that the power amplifier operates within a linear range.

In the prior art, a transmitter performs clipping processing by using one level of clipping, for example, abase station implements clipping in a remote radio unit (RRU), which limits a clipping scalability function.

SUMMARY

In view of the above, this application provides a clipping method and an apparatus, to improve flexibility and scalability of clipping.

According to an aspect, an embodiment of the present disclosure provides a base station, including: a baseband unit BBU and a remote radio unit RRU, where the BBU includes a first processor, and the RRU includes a second processor; the first processor is configured to: perform clipping after combining N input carriers, and output N carriers obtained after a first level of clipping; and the second processor is configured to: perform clipping after combining the N carriers obtained after the first level of clipping, and output N carriers obtained after a second level of clipping, where N is an integer greater than or equal to 2.

In the foregoing solution, the base station separately performs clipping at the BBU and the RRU, so that the base station can flexibly select, according to processing capabilities of different baseband processing boards or baseband chips, a baseband processing board or a baseband chip to deploy the first level of clipping, which improves scalability of clipping performed by the base station.

In one possible implementation manner, that the first processor performs clipping after combining N input carriers includes: upsampling each carrier of the N input carriers, where a sampling rate used in the upsampling is N times an original sampling rate of each carrier; combining N upsampled carriers, extracting a noise from a combined signal, and splitting the noise to obtain a noise of each carrier; downsampling the noise of each carrier, where a sampling rate used in the downsampling is the same as the original sampling rate of each carrier; and delaying each carrier of the N input carriers, canceling a downsampled noise of each carrier from each delayed carrier, to obtain each carrier obtained after the first level of clipping, where during noise cancellation, a delay of each delayed carrier is the same as a delay of the downsampled noise of each carrier.

In the foregoing solution, after noises of carriers are extracted and allocated, a noise sampling rate is restored to an original sampling rate of a carrier by downsampling, which reduces noise bandwidth, thereby correspondingly reducing bandwidth of carrier data that needs to be transmitted by using an interface between the BBU and the RRU.

In one possible implementation manner, the first processor is further configured to delay the N carriers obtained after the first level of clipping; and the second processor is further configured to delay, before combining the N carriers obtained after the first level of clipping, the N carriers obtained after the first level of clipping, where when the second processor is configured to combine the N carriers obtained after the first level of clipping, a delay difference between the N carriers obtained after the first level of clipping is equal to a delay difference between the N upsampled carriers to be combined. In this implementation manner, delay differences between different carriers are the same during the first level of clipping and the second level of clipping, thereby improving clipping performance.

In one possible implementation manner, the second processor is further configured to delay, before combining the N carriers obtained after the first level of clipping, the N carriers obtained after the first level of clipping, where when the second processor is configured to combine the N carriers obtained after the first level of clipping, a delay difference between the N carriers obtained after the first level of clipping is equal to a delay difference between the N upsampled carriers to be combined. In this implementation manner, delay differences between different carriers are the same during the first level of clipping and the second level of clipping, thereby improving clipping performance.

In another possible implementation manner, the first processor is further configured to: perform, before noise cancellation is performed on each delayed carrier, fast Fourier transform FFT on the downsampled noise of each carrier to obtain frequency-domain data; perform weighting on the frequency-domain data; and perform inverse fast Fourier transform IFFI on weighted frequency-domain data to obtain a weighted downsampled noise of each carrier. A noise of a carrier is transformed into a frequency domain for weighting, which implements fine granularity processing in the frequency domain, thereby improving clipping performance.

In any one of the foregoing possible implementation manners, frame headers of frames respectively carried by the N input carriers are aligned when the frames arrive at an antenna. Frame headers of frames carried by different carriers are aligned when an antenna transmits each carrier signal, which meets requirements of carrier aggregation.

According to another aspect, an embodiment of the present disclosure provides a clipping method, including: performing clipping after N input carriers are combined, and outputting N carriers obtained after a first level of clipping; and performing clipping after the N carriers obtained after the first level of clipping are combined, and outputting N carriers obtained after a second level of clipping, where N is an integer greater than or equal to 2.

The foregoing solution implements distributed clipping, and the first level of clipping and the second level of clipping can be flexibly deployed according to a processing capability of a clipping apparatus, thereby improving clipping processing flexibility.

In one possible implementation manner, the performing clipping after N input carriers are combined includes: upsampling each carrier of the N input carriers, where a sampling rate used in the upsampling is N times an original sampling rate of each carrier; combining N upsampled carriers, extracting a noise from a combined signal, and splitting the noise to obtain a noise of each carrier; downsampling the noise of each carrier, where a sampling rate used in the downsampling is the same as the original sampling rate of each carrier; and delaying each carrier of the N input carriers, canceling a downsampled noise of each carrier from each delayed carrier, to obtain each carrier obtained after the first level of clipping, where during noise cancellation, a delay of each delayed carrier is the same as a delay of the downsampled noise of each carrier.

In the foregoing solution, after noises of carriers are extracted and allocated, a noise sampling rate is restored to an original sampling rate of a carrier by downsampling, which reduces noise bandwidth, thereby reducing bandwidth of carrier data.

In one possible implementation manner, the clipping method is performed by a base station. The base station can flexibly select, according to processing capabilities of different baseband processing boards or baseband chips, a baseband processing board or a baseband chip to deploy the first level of clipping, which improves scalability of clipping performed by the base station.

In one possible implementation manner, the step of performing clipping after N input carriers are combined, and outputting N carriers obtained after a first level of clipping may be performed by a BBU, and the step of performing clipping after the N carriers obtained after the first level of clipping are combined, and outputting N carriers obtained after a second level of clipping may be performed by an RRU.

In another possible implementation manner, the method further includes: delaying, before the outputting N carriers obtained after a first level of clipping, the N carriers obtained after the first level of clipping; and delaying, before the N carriers obtained after the first level of clipping are combined, the N carriers obtained after the first level of clipping, where when the N carriers obtained after the first level of clipping are combined, a delay difference between the N carriers obtained after the first level of clipping is equal to a delay difference between the N upsampled carriers to be combined. In this implementation manner, delay differences between different carriers are the same during the first level of clipping and the second level of clipping, thereby improving clipping performance.

Optionally, the step of delaying, before the outputting N carriers obtained after a first level of clipping, the N carriers obtained after the first level of clipping may be performed by a BBU, and the step of delaying, before the N carriers obtained after the first level of clipping are combined, the N carriers obtained after the first level of clipping may be performed by an RRU.

In still another possible implementation manner, the method further includes: delaying, before the N carriers obtained after the first level of clipping are combined, the N carriers obtained after the first level of clipping, where when the N carriers obtained after the first level of clipping are combined, a delay difference between the N carriers obtained after the first level of clipping is equal to a delay difference between the N upsampled carriers to be combined. In this implementation manner, delay differences between different carriers are the same during the first level of clipping and the second level of clipping, thereby improving clipping performance.

Optionally, the step of delaying, before the N carriers obtained after the first level of clipping are combined, the N carriers obtained after the first level of clipping may be performed by an RRU.

In any one of the foregoing possible implementation manners, the method may further include: performing, before noise cancellation is performed on each delayed carrier, fast Fourier transform FFT on the downsampled noise of each carrier to obtain frequency-domain data; performing weighting on the frequency-domain data; and performing inverse fast Fourier transform IFFI on weighted frequency-domain data to obtain a weighted downsampled noise of each carrier. A noise of a carrier is transformed into a frequency domain for weighting, which implements fine granularity processing in the frequency domain, thereby improving clipping performance.

In any one of the foregoing implementation manners, frame headers of frames respectively carried by the N input carriers are aligned when the frames arrive at an antenna. Because frame headers of frames carried by different carriers are aligned when an antenna transmits each carrier signal, requirements of carrier aggregation are met.

According to still another aspect, an embodiment of the present disclosure provides a base station, and the base station has a function of implementing the foregoing clipping method. The function may be implemented by hardware, or may be implemented by hardware by executing corresponding software. The hardware includes one or more modules corresponding to the foregoing function. The modules may be software and/or hardware.

According to yet another aspect, an embodiment of the present disclosure provides a computer storage medium, configured to store a computer program instruction used by the foregoing base station, where the computer program instruction includes related programs used for performing the foregoing method.

DESCRIPTION OF EMBODIMENTS

Figure 1:
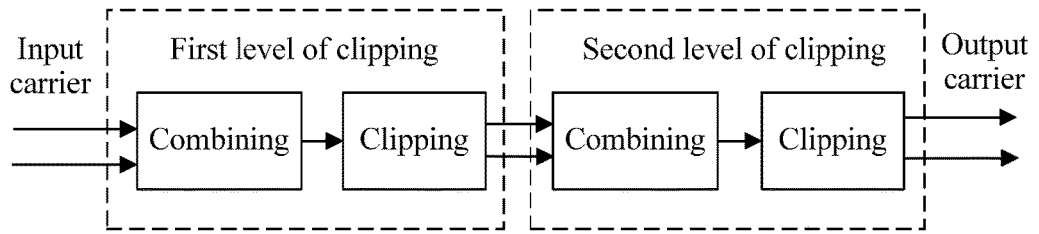
FIG. 1 is a schematic diagram of a clipping solution according to an embodiment of the present disclosure.

FIG. 1 is a schematic diagram of a clipping solution according to an embodiment of the present disclosure. The clipping solution may be applied to a clipping apparatus, such as a base station or another network device. As shown in FIG. 1, in the clipping solution provided in this embodiment of the present disclosure, clipping is performed after N input carriers are combined, and N carriers obtained after a first level of clipping are output. Clipping is performed again after the N carriers obtained after the first level of clipping are combined, and N carriers obtained after a second level of clipping are output. For clarity of description, only a scenario in which two input carriers exist is shown in FIG. 1, and it can be understood that there may also be multiple carriers, that is, N may be an integer greater than or equal to 2. The clipping solution provided in this embodiment of the present disclosure implements distributed clipping, and the first level of clipping and the second level of clipping can be flexibly deployed according to a processing capability of the clipping apparatus, thereby improving flexibility of clipping processing.

Figure 2:
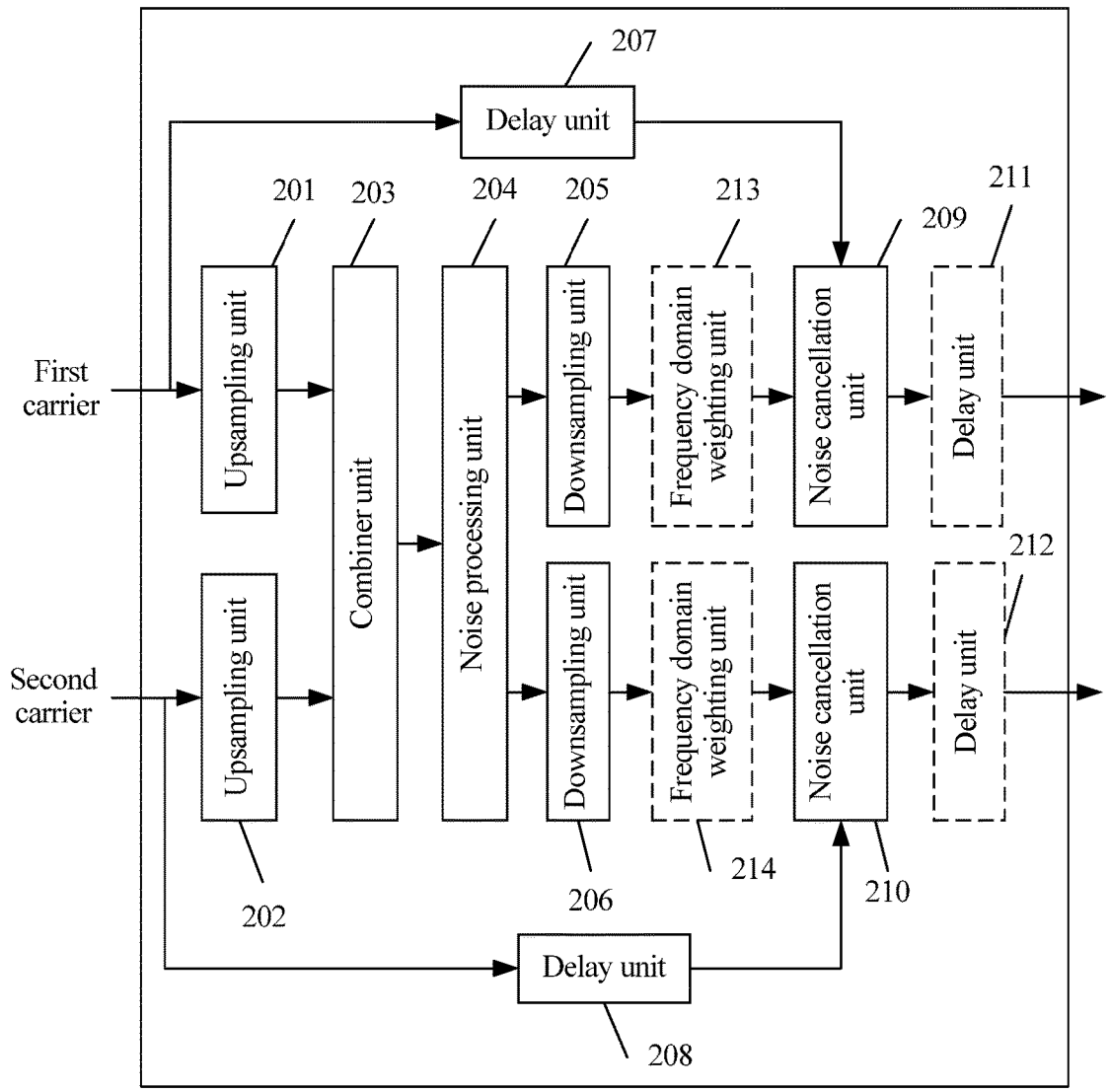
FIG. 2 is a schematic diagram of a first level of clipping processing performed by a clipping apparatus according to an embodiment of the present disclosure.

FIG. 2 exemplarily shows a schematic functional diagram of a first level of clipping processing performed by the clipping apparatus provided in FIG. 1. For clarity of description, only a scenario in which two input carriers exist is exemplarily shown in FIG. 2. It can be understood that the solution provided in this embodiment of the present disclosure is also applicable to a scenario in which multiple input carriers exist.

As shown in FIG. 2, the clipping apparatus includes: upsampling units 201 and 202, a combiner unit 203, a noise processing unit 204, downsampling units 205 and 206, delay units 207 and 208, and noise cancellation units 209 and 210.

The upsampling units 201 and 202 are configured to perform upsampling processing on an input first carrier and an input second carrier respectively, where sampling rates used in the upsampling are respectively twice an original sampling rate of the input first carrier and an original sampling rate of the input second carrier. It can be understood that, for a multicarrier scenario, for example, when there are N carriers, a sampling rate used in the upsampling processing is N times an original sampling rate of an input carrier.

The combiner unit 203 is configured to: perform combining processing on an upsampled first carrier and an upsampled second carrier that are output by the upsampling units 201 and 202, and output a combined signal. For example, the combiner unit 203 may be implemented by a numerically controlled oscillator (Numerically Controlled Oscillator, NCO).

The noise processing unit 204 is configured to: extract a noise from the combined signal output by the combiner unit 203, split the noise, and output a noise of the first carrier and a noise of the second carrier.

The downsampling units 205 and 206 are configured to perform downsampling processing on the noise of the first carrier and the noise of the second carrier respectively, and sampling rates used in the downsampling processing are respectively the same as the original sampling rate of the input first carrier and the original sampling rate of the input second carrier. After noises of carriers are downsampled, a noise sampling rate is restored to an original sampling rate of a carrier, which reduces noise bandwidth, thereby correspondingly reducing bandwidth of carrier data that needs to be transmitted by using an interface between a BBU and an RRU.

The delay units 207 and 208 are configured to perform delay processing on the input first carrier and the input second carrier respectively, and output the delayed first carrier and the delayed second carrier.

In an example, cancellation processing is performed, respectively at the noise cancellation units 209 and 210, on a downsampled noise of the first carrier and a downsampled noise of the second carrier that are output by the downsampling units 205 and 206, and the delayed first carrier and the delayed second carrier that are output by the delay units 207 and 208. The cancellation (cancellation) processing may be reverse superimposition. For example, a downsampled noise of a carrier is canceled from a delayed carrier, that is, the downsampled noise of the carrier is reversely superimposed onto the corresponding delayed carrier. Preferably, during noise cancellation, a delay of each delayed carrier is the same as a delay of a downsampled noise of a corresponding carrier. In other words, each carrier and a noise of the carrier are synchronous in terms of time during noise cancellation, that is, each carrier and a noise of the carrier are aligned in terms of time.

The noise cancellation unit 209 is configured to: cancel the downsampled noise of the first carrier from the delayed first carrier to obtain a first carrier obtained after the first level of clipping, and output the first carrier obtained after the first level of clipping, where a delay of the delayed first carrier is the same as a delay of the downsampled noise of the first carrier at a first noise cancellation unit 209.

The noise cancellation unit 210 is configured to: cancel the downsampled noise of the second carrier from the delayed second carrier to obtain a second carrier obtained after the first level of clipping, and output the second carrier obtained after the first level of clipping, where a delay of the delayed second carrier is the same as a delay of the downsampled noise of the second carrier at a second noise cancellation unit 210.

A delay of each delayed carrier is the same as a delay of a downsampled noise of each carrier at a noise cancellation unit, which may improve noise cancellation performance, thereby improving clipping performance.

In another example, the clipping apparatus may further include frequency domain weighting units 213 and 214. The frequency domain weighting units respectively perform fast Fourier transform (FFT) on the downsampled noise of the first carrier and the downsampled noise of the second carrier that are output by the downsampling units 205 and 206, perform weighting on frequency-domain data obtained after FFT processing, and perform inverse fast Fourier transform (IFFT) on weighted frequency-domain data to obtain a weighted downsampled noise of the first carrier and a weighted downsampled noise of the second carrier.

After the processing of the frequency domain weighting units, fine granularity processing in a frequency domain is implemented, and clipping performance is improved. With evolution of a communications system, different service signals have different EVM indicator and power requirements, and adaptive modulation and higher order modulation also impose a requirement on fine granularity clipping in the frequency domain. In the foregoing embodiment, a noise of a carrier is transformed into a frequency domain for weighting, and a weighting parameter may be flexibly set according to actual system requirements, which implements fine granularity allocation of noises in the frequency domain, and meets evolution requirements of the communications system.

The weighted downsampled noise of the first carrier and the weighted downsampled noise of the second carrier are output to the noise cancellation units 209 and 210. The noise cancellation units 209 and 210 separately perform cancellation processing on the delayed first carrier and the delayed second carrier that are output by the delay units 207 and 208, and the noise of the first carrier and the noise of the second carrier that are output by the frequency domain weighting units 213 and 214, and respectively output the first carrier and the second carrier that are obtained after the first level of clipping. Preferably, when the noise cancellation units 209 and 210 perform noise cancellation, delays of delayed carriers output by the delay units 207 and 208 are the same as delays of corresponding noises, of carriers, output by the frequency domain weighting units 213 and 214. In other words, each carrier and a corresponding noise of the carrier are synchronous in terms of time during noise cancellation, that is, each carrier and a corresponding noise of the carrier are aligned in terms of time.

Optionally, the clipping apparatus may further include a delay adjustment unit (not shown in FIG. 2), configured to perform delay processing on the input carriers of the upsampling units 201 and 202, so that the input carriers are synchronous in terms of time at the upsampling units 201 and 202.

Optionally, the clipping apparatus may further include delay units 211 and 212, configured to respectively perform delay processing on the first carrier and the second carrier that are obtained after the first level of clipping and are output by the noise cancellation units 209 and 210. With reference to delay processing of an apparatus for a second level of clipping, delay differences between different carriers may keep consistent during two times of combining.

The first carrier and the second carrier that are obtained after the first level of clipping are used as input carriers of a second level of clipping processing for combining and clipping, and then a first carrier and a second carrier that are obtained after the second level of clipping are output. In an example, for the second level of clipping processing, a method similar to that of the foregoing first level of clipping processing may be used. For details, reference may be made to the foregoing description, and details are not described herein. In another example, for the second level of clipping processing, an existing clipping algorithm (such as peak clipping and Kernel clipping), clipping circuit, or chip may also be used, or a new clipping algorithm, circuit, or chip may be used, to achieve an effect of suppressing a high-power glitch.

In the clipping solution provided in this embodiment of the present disclosure, two levels of clipping processing are preferably provided. It can be understood that multiple levels of clipping processing may also be performed according to requirements with reference to the clipping solution provided in this embodiment of the present disclosure.

Figure 3:
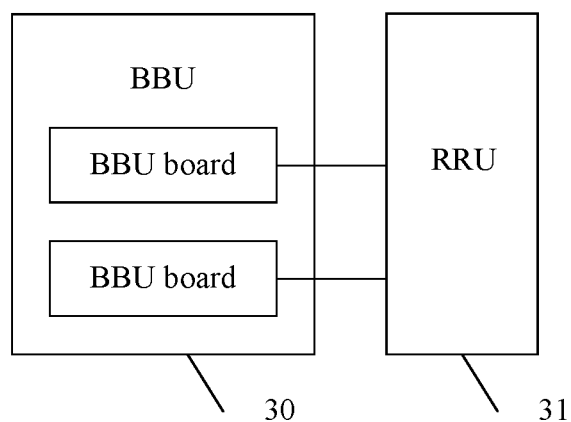
FIG. 3 is a schematic structural diagram of a base station according to an embodiment of the present disclosure.

The following uses an example in which a base station is used as the clipping apparatus to describe in detail the clipping solution provided in the embodiments of the present disclosure. FIG. 3 shows a schematic structural diagram of a base station. The base station includes a baseband unit (BBU) 30 and a remote radio unit (RRU) 31. After performing baseband processing on one or more carriers, the BBU 30 sends a signal to the RRU for intermediate frequency and radio frequency processing. The BBU 30 generally includes one or more BBU boards, and each BBU board is configured to process one or more carriers. The RRU 31 may include one or more radio frequency channels. One radio frequency channel in the RRU 31 may receive and process one or more carriers from the BBU 30. The BBU 30 may process carriers of one or more cells, and may further process carriers of cells with different access standards. For clarity of description, FIG. 3 shows only a scenario in which one RRU 31 connects to two BBU boards. It can be understood that FIG. 3 shows only function division of the base station. On a physical entity, the BBU 30 and the RRU 31 may be disposed separately, which is commonly referred to as a distributed base station, or the BBU 30 and the RRU 31 may be disposed together.

Figure 4:
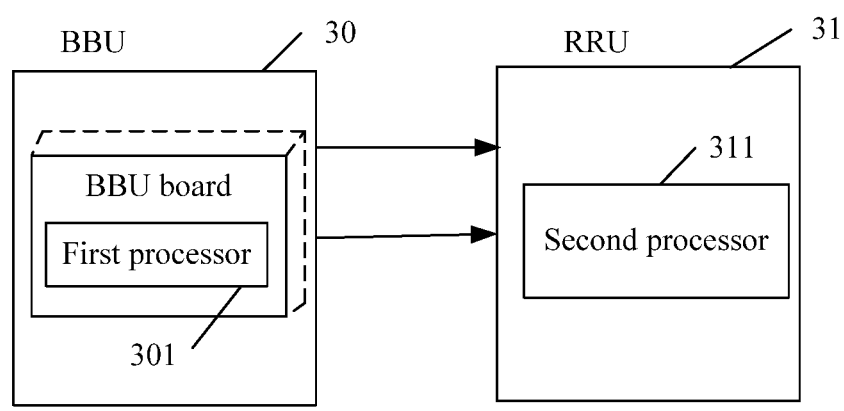
FIG. 4 is a schematic structural diagram of another base station according to an embodiment of the present disclosure.

The baseband unit BBU 30 includes one or more first processors 301, configured to perform the first level of clipping processing in the clipping solution in the foregoing embodiment. For example, as shown in FIG. 4, two or more BBU boards share one first processor 301. It can be understood that one first processor 301 may also be disposed on each BBU board.

The RRU 31 includes one or more second processors 311, configured to perform the second level of clipping processing in the clipping solution in the foregoing embodiment. For example, FIG. 4 shows an example in which the RRU 31 includes one second processor 311.

The BBU 30 is connected to the RRU 31 by using one or more interfaces. In an example, the interface may be a common public radio interface (CPRI).

It should be noted that, in this embodiment of the present disclosure, the first processor 301 or the second processor 311 may be two or more chips distributed on a same board or cabinet or on different boards or cabinets, for example, general purpose processor chips, field programmable gate array (FPGA) chips, application-specific integrated circuit (ASIC) chips, and digital signal processor (DSP) chips.

Specifically, the first processor 301 is configured to perform clipping processing after combining input carriers, and output carriers obtained after a first level of clipping.

The second processor 311 is configured to perform clipping again after combining the carriers obtained after the first level of clipping, and output carriers obtained after a second level of clipping. For specific processes of the first level of clipping processing and the second level of clipping processing, reference may be made to FIG. 2 and related descriptions of the clipping solution in the foregoing embodiment, and details are not described herein.

It can be understood that the solution provided in this embodiment of the present disclosure may be applicable to a scenario in which one or more carriers exist. In a multi-carrier scenario, one radio frequency channel of the RRU is generally corresponding to multiple baseband processing boards or baseband chips, and different baseband processing boards or chips have different processing capabilities.

According to the solution provided in this embodiment of the present disclosure, clipping processing may be distributed to the BBU and the RRU for implementation. Therefore, a baseband processing board or a baseband chip can be flexibly selected according to processing capabilities of different baseband processing boards or baseband chips to deploy a first level of clipping, which improves scalability of clipping performed by the base station.

In an example, clipping processing may be mainly deployed at the BBU for the first level of clipping. The second level of clipping deployed at the RRU is mainly to avoid that a signal sent to a power amplifier has a short-time high-power glitch, which causes the power amplifier to exceed rated power. For example, for specific implementation of the second level of clipping, an existing clipping algorithm, clipping circuit, or chip in the prior art may be used, or a new clipping algorithm, circuit, or chip may be used, to achieve an effect of suppressing a high-power glitch.

In another example, in a scenario in which the RRU supports multiple radio frequency channels, clipping processing corresponding to different radio frequency channels may be deployed on different baseband processing boards or baseband chips, to implement load balancing of the base station.

In an example, when the BBU 30 transmits, after completing the first level of clipping on the input carriers, input carriers obtained after the first level of clipping to the RRU 31 for the second level of clipping, because different carriers have different transmission paths, different carriers may arrive at the RRU 31 at different delays. For example, when different carriers are transmitted to the RRU by using fibers, due to different lengths of the fibers or different transmission delays of optical interfaces, a phase relationship between two carriers may change when different carriers arrive at the RRU for combining. Therefore, it is required to ensure that delay differences between different carriers keep consistent during two times of combining.

For example, delay processing may be separately performed by the first processor 301 and the second processor 311, so as to implement equal delay differences between different carriers during combining. For another example, delay processing may be performed only by the second processor 311, that is, delay processing is performed before the carriers obtained after the first level of clipping are combined, so that delay differences between different carriers are equal, thereby improving clipping performance.

In this embodiment of the present disclosure, optionally, frame headers of frames respectively carried by an input first carrier and an input second carrier are aligned when the frames arrive at an antenna.

To meet requirements of carrier aggregation (Carrier Aggregation, CA), frame headers of frames carried by different carriers need to be aligned when an antenna transmits each carrier signal.

In this embodiment of the present disclosure, when different carriers have different power, the BBU 30 may perform power compensation on the carriers to equalize the power of the carriers. When different carriers have different frequency responses on a same radio frequency channel, the BBU 30 may further perform phase compensation and amplitude compensation on the carriers. The frequency responses may be reported to the BBU 30 by the RRU 31.

It should be noted that, the foregoing description about the base station merely exemplarily provides a related structure for achieving an objective of the embodiment of the present disclosure. Persons skilled in the art can understand that the base station may further include necessary structures required for implementing functions of the base station, such as a baseband chip, an antenna, and a necessary electronic circuit. For details, reference may be made to related structures of a base station in the prior art, and details are not described herein.

With descriptions of the foregoing embodiments, persons skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in a definition of a medium to which they belong. For example, a disk and disc used by the present disclosure includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In a word, in the foregoing implementation manners, the objectives, technical solutions, and beneficial effects of the present disclosure are described in detail. It can be understood that the foregoing descriptions are merely specific implementation manners of the present disclosure, but are not intended to limit the protection scope of present disclosure. Any modification, equivalent replacement, or improvement made on the basis of the technical solutions of the present disclosure shall fall within the protection scope of the present disclosure.

What is claimed is:

1. A base station comprising:
  a baseband unit (BBU) comprising a first processor configured to:
  perform clipping after combining N input carriers, wherein to perform clipping after combining the N input carriers, the processor is configured to:
  upsample each carrier of the N input carriers, wherein a sampling rate used in the upsampling is N times an original sampling rate of each carrier, combine N upsampled carriers, extract a noise from a combined signal, split the noise to obtain a noise of each carrier,
  downsample the noise of each carrier, wherein a sampling rate used in the downsampling is the same as the original sampling rate of each carrier, delay each carrier of the N input carriers, and
  cancel a downsampled noise of each carrier from each delayed carrier, to obtain each carrier obtained after a first level of clipping, wherein during noise cancellation, a delay of each delayed carrier is the same as a delay of the downsampled noise of each carrier;
  output N carriers obtained after the first level of clipping; and
  a remote radio unit (RRU) comprising a second processor configured to:
    perform clipping after combining the N carriers obtained after the first level of clipping, and
    output N carriers obtained after a second level of clipping, wherein N is an integer greater than or equal to 2.

2. The base station according to claim 1, wherein:
  the first processor is further configured to delay the N carriers obtained after the first level of clipping;
  the second processor is further configured to delay, before combining the N carriers obtained after the first level of clipping, the N carriers obtained after the first level of clipping; and
  wherein when the second processor is configured to combine the N carriers obtained after the first level of clipping, a delay difference between the N carriers obtained after the first level of clipping is equal to a delay difference between the N upsampled carriers to be combined.

3. The base station according to claim 1, wherein the second processor is further configured to:

delay, before combining the N carriers obtained after the first level of clipping, the N carriers obtained after the first level of clipping, wherein when the second processor is configured to combine the N carriers obtained after the first level of clipping, a delay difference between the N carriers obtained after the first level of clipping is equal to a delay difference between the N upsampled carriers to be combined.

4. The base station according to claim 1, wherein the first processor is further configured to:

perform, before noise cancellation is performed on each delayed carrier, fast Fourier transform (FFT) on the downsampled noise of each carrier to obtain frequency-domain data;

perform weighting on the frequency-domain data; and perform inverse fast Fourier transform (IFFT) on weighted frequency-domain data to obtain a weighted downsampled noise of each carrier.

5. The base station according to claim 1, wherein frame headers of frames respectively carried by the N input carriers are aligned when the frames arrive at an antenna.

6. A clipping method, comprising:

performing clipping after N input carriers are combined, wherein performing clipping after the N input carriers are combined comprises:

upsampling each carrier of the N input carriers, wherein a sampling rate used in the upsampling is N times an original sampling rate of each carrier, combining N upsampled carriers, extracting a noise from a combined signal, splitting the noise to obtain a noise of each carrier, downsampling the noise of each carrier, wherein a sampling rate used in the downsampling is the same as the original sampling rate of each carrier, delaying each carrier of the N input carriers, and canceling a downsampled noise of each carrier from each delayed carrier, to obtain each carrier obtained after a first level of clipping, wherein during noise cancellation, a delay of each delayed carrier is the same as a delay of the downsampled noise of each carrier;

outputting N carriers obtained after the first level of clipping;

performing clipping after the N carriers obtained after the first level of clipping are combined; and outputting N carriers obtained after a second level of clipping, wherein N is an integer greater than or equal to 2.

7. The clipping method according to claim 6, further comprising:

delaying, before the outputting N carriers obtained after a first level of clipping, the N carriers obtained after the first level of clipping; and delaying, before the N carriers obtained after the first level of clipping are combined, the N carriers obtained after the first level of clipping, wherein when the N carriers obtained after the first level of clipping are combined, a delay difference between the N carriers obtained after the first level of clipping is equal to a delay difference between the N upsampled carriers to be combined.

8. The clipping method according to claim 6, further comprising:

delaying, before the N carriers obtained after the first level of clipping are combined, the N carriers obtained after the first level of clipping, wherein when the N carriers obtained after the first level of clipping are combined, a delay difference between the N carriers obtained after the first level of clipping is equal to a delay difference between the N upsampled carriers to be combined.

9. The clipping method according to claim 6, further comprising:

performing, before noise cancellation is performed on each delayed carrier, fast Fourier transform (FFT) on the downsampled noise of each carrier to obtain frequency-domain data;

performing weighting on the frequency-domain data; and performing inverse fast Fourier transform (IFFT) on weighted frequency-domain data to obtain a weighted downsampled noise of each carrier.

10. The clipping method according to claim 6, wherein frame headers of frames respectively carried by the N input carriers are aligned when the frames arrive at an antenna.

* * * * *